United States Patent
Jang (10) Patent No.: US 7,365,500 B2
(45) Date of Patent: Apr. 29, 2008

(54) DISPLAY DEVICE HAVING LAMP CONTROL CIRCUIT

(75) Inventor: Hyeon-Yong Jang, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/205,371

(22) Filed: Aug. 16, 2005

(65) Prior Publication Data

US 2006/0091820 A1 May 4, 2006

(30) Foreign Application Priority Data

Nov. 4, 2004 (KR) .............. 10-2004-0089245

(51) Int. Cl.
*H05B 41/16* (2006.01)
(52) U.S. Cl. .............. 315/274; 315/276; 315/291; 315/209 R; 315/224
(58) Field of Classification Search .......... 315/209 R, 315/224, 225, 274–289, 291, 307–311
See application file for complete search history.

(56) References Cited

U.S. PATENT DOCUMENTS

| | | | |
|---|---|---|---|
| 4,485,434 A * | 11/1984 | Beeston et al. ............ 363/132 |
| 5,173,643 A * | 12/1992 | Sullivan et al. ............ 315/276 |
| 5,184,290 A * | 2/1993 | Ozawa et al. ............ 363/21.07 |
| 5,317,497 A * | 5/1994 | Belek ............ 363/40 |
| 5,583,402 A * | 12/1996 | Moisin et al. ............ 315/307 |
| 6,064,579 A * | 5/2000 | Copple et al. ............ 363/17 |
| 6,531,835 B2 * | 3/2003 | Chen et al. ............ 315/307 |
| 6,794,831 B2 * | 9/2004 | Leeb et al. ............ 315/307 |

* cited by examiner

*Primary Examiner*—Tuyet T Vo
(74) *Attorney, Agent, or Firm*—MacPherson Kwok Chen & Heid LLP (57) ABSTRACT

A driving device is provided, which includes: a switching unit directly connected to a first voltage from a source external to the driving device; a transforming unit indirectly connected to the switching unit for transforming the first voltage into a second voltage and applying the second voltage to a light source; a signal transmitting unit indirectly connected to the switching unit and transmitting a driving voltage for driving the switching unit based on a control signal; and an inverter controller outputting the control signal to the signal transmitting unit.

19 Claims, 6 Drawing Sheets

DISPLAY DEVICE HAVING LAMP CONTROL CIRCUIT

BACKGROUND OF THE INVENTION (a) Field of the Invention

The present invention relates to a display device and a driving device of a light source thereof.

(b) Description of Related Art

An artificial light source, which is part of a backlight assembly, is often implemented as a plurality of fluorescent lamps such as CCFLs (cold cathode fluorescent lamps) and EEFLs (external electrode fluorescent lamps) driven by an inverter. The inverter converts a DC voltage into an AC voltage and applies the AC voltage to the lamps to be turned on. The inverter adjusts luminance of the lamps based on a luminance control signal to control the luminance of the LCD. In addition, inverter feedback controls the voltages applied to the lamps based on the currents of the lamps.

For controlling a plurality of CCFLs, the backlight assembly also includes a plurality of transformers connected to the lamps to apply a high voltage to a hot electrode of each CCFL, and a resistor sensing currents flowing through the CCFLs and connected between cold electrodes of the CCFLs and a ground. The sensed current is relative to the total current plus the current flowing through the cold electrode of each CCFL. Thus, the operating states of the CCFLs are not exactly determined in using the sensed current.

Display devices used for monitors of computers and television sets generally include self-emitting display devices such as organic light emitting displays (OLEDs), vacuum fluorescent displays (VFDs), field emission displays (FEDs), and plasma panel displays (PDPs), and non-emitting display devices such as liquid crystal displays (LCDs) requiring an external light source.

An LCD includes two panels provided with field-generating electrodes and a liquid crystal (LC) layer having dielectric anisotropy and interposed therebetween. The field-generating electrodes that are supplied with electric voltages generate electric field across the LC layer, and the light transmittance of the liquid crystal layer varies depending on the strength of the applied field, which can be controlled by the applied voltages. Accordingly, desired images are displayed by adjusting the applied voltages.

The light for an LCD is provided by lamps equipped at the LCD, or may be natural light.

The lamps for the LCD, which is a part of a backlight assembly, usually include fluorescent lamps such as CCFLs (cold cathode fluorescent lamps) and EEFLs (external electrode fluorescent lamps) driven by an inverter. The inverter converts a DC voltage into an AC voltage and applies the AC voltage to the lamps to be turned on. The inverter adjusts luminance of the lamps based on a luminance control signal to control the luminance of the LCD. In addition, the inverter feedback controls the voltages applied to the lamps based on the currents of the lamps.

Since, for driving the LCD, the backlight assembly is directly supplied with an external AC voltage, that is, a high common power source of a high current of about 110V or 220V, the dangers of electric shock to people and of lightning become large. Thus, to protect against these dangers, the backlight assembly must be supplied with a separate DC voltage of a high voltage and a low current separated from the common power source, which is transformed by a DC-DC converter. Due to the separate DC-DC converter, the manufacturing cost and consumption power are increased.

In addition, the weight and size of the backlight assembly increase, thereby the design efficiency of the display devices is decreased.

SUMMARY OF THE INVENTION

In an embodiment of the present invention, a driving device is provided, which includes: a switching unit directly connected to a first voltage from a source external to the driving device; a transforming unit indirectly connected to the switching unit for transforming the first voltage into a second voltage and applying the second voltage to a light source; a signal transmitting unit indirectly connected to the switching unit and transmitting a driving voltage for driving the switching unit based on a control signal; and an inverter controller outputting the control signal to the signal transmitting unit.

The signal transmitting unit may be a pulse transforming unit.

The pulse transforming unit may include a pulse transformer and a rectifier.

The signal transmitting unit may include a photocoupler.

The driving device may further include a capacitor connected to the switching unit and the transforming unit and being charged or discharged based on the operation of the switching unit.

The driving device may further include a current sensing unit connected to the transforming unit, sensing a current flowing through the light source, and supplying information with the respect to the current to the inverter controller.

The switching unit may include a first switching element including a first input terminal connected to the first voltage, a first control terminal connected to the signal transmitting unit, a first output terminal connected to the transforming unit, a second switching element including a second input terminal connected to the output terminal of the first switching element, a second control terminal connected to the signal transmitting unit, and a second output terminal connected to a ground.

The first and second switching elements may be turned on in turn.

The signal transmitting unit may include a first pulse transformer connected to the first switching element and a second pulse transformer connected to the second switching element.

The signal transmitting unit may include a first photocoupler connected to the first switching element and a second photocoupler connected to the second switching element.

The first and second switching elements may be MOS (metal oxide silicon) transistors.

In a further embodiment of the present invention, a driving device is provided, which includes: a switching unit including an input terminal directly connected to a first voltage from a source external to the driving device; a transforming unit connected to an output terminal of the switching unit and a light source; a signal transmitting unit connected to a control terminal of the switching unit; and an inverter controller outputting a control signal to the signal transmitting unit. The transforming unit includes a transformer member, and the switching unit and the light source are indirectly connected to the transformer member; and the signal transmitting unit includes a signal transmitting member, and the inverter controller and the switching unit are indirectly connected to each other through the signal transmitting member to indirectly transmit the control signal from the inverter controller to the switching unit.

The transformer member may include a primary coil connected to the switching unit and a secondary coil connected to the light source.

The signal transmitting member may include a pulse transformer including a primary coil connected to the inverter controller and a secondary coil connected to the switching element, and a rectifier connected to the secondary coil.

The signal transmitting member may be a photocoupler.

The driving device may further include a capacitor connected to the switching element and the transforming unit.

In a still further embodiment of the present invention, a display device is provided, which includes: a plurality of pixels arranged in a matrix; at least one light source supplying light to the pixels; a switching unit directly connected to a first voltage from a source external to the display device; a transforming unit indirectly connected to the switching unit for transforming the first voltage into a second voltage and applying the second voltage to the light source; a signal transmitting unit indirectly connected to the switching unit and transmitting a driving voltage for driving the switching unit based on a control signal; and an inverter controller outputting the control signal to the signal transmitting unit.

The signal transmitting unit may be a pulse transforming unit.

The pulse transforming unit may include a pulse transformer and a rectifier.

The signal transmitting unit may include a photocoupler.

The display device may further include a capacitor connected to the switching unit and the transforming unit, and being charged or discharged based on the operation of the switching unit.

BRIEF DESCRIPTION OF THE DRAWINGS

The present invention will become more apparent by describing preferred embodiments thereof in detail with reference to the accompanying drawings, in which.

DETAILED DESCRIPTION OF EMBODIMENTS

The present invention will be described more fully hereinafter with reference to the accompanying drawings, in which embodiments of the present invention are shown.

In the drawings, the thickness of layers and regions are exaggerated for clarity. Like numerals refer to like elements throughout. It will be understood that when an element such as a layer, film, region, substrate, or panel is referred to as being "on" another element, it can be directly on the other element or intervening elements may also be present. In contrast, when an element is referred to as being "directly on" another element, there are no intervening elements present.

A liquid crystal display as an example of a display device and a driving device of a light source for a liquid crystal display according to embodiments of the present invention will be described with reference to the accompanying drawings.

A liquid crystal display according to an embodiment of the present invention will now be described in detail with reference to FIGS. 1 to 3.

Figure 1:
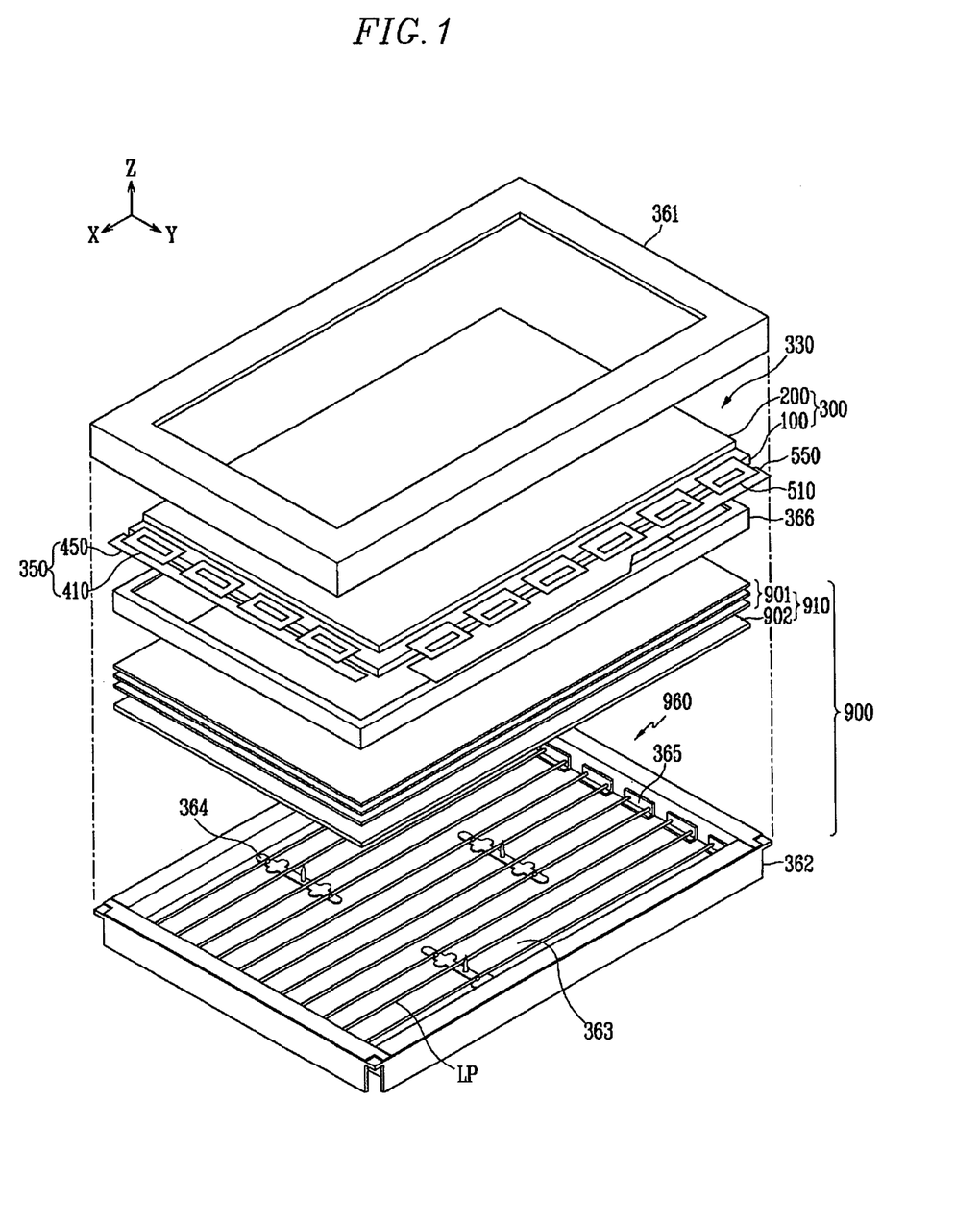
FIG. 1 is an exploded perspective view of an LCD according to an embodiment of the present invention.
Figure 2:
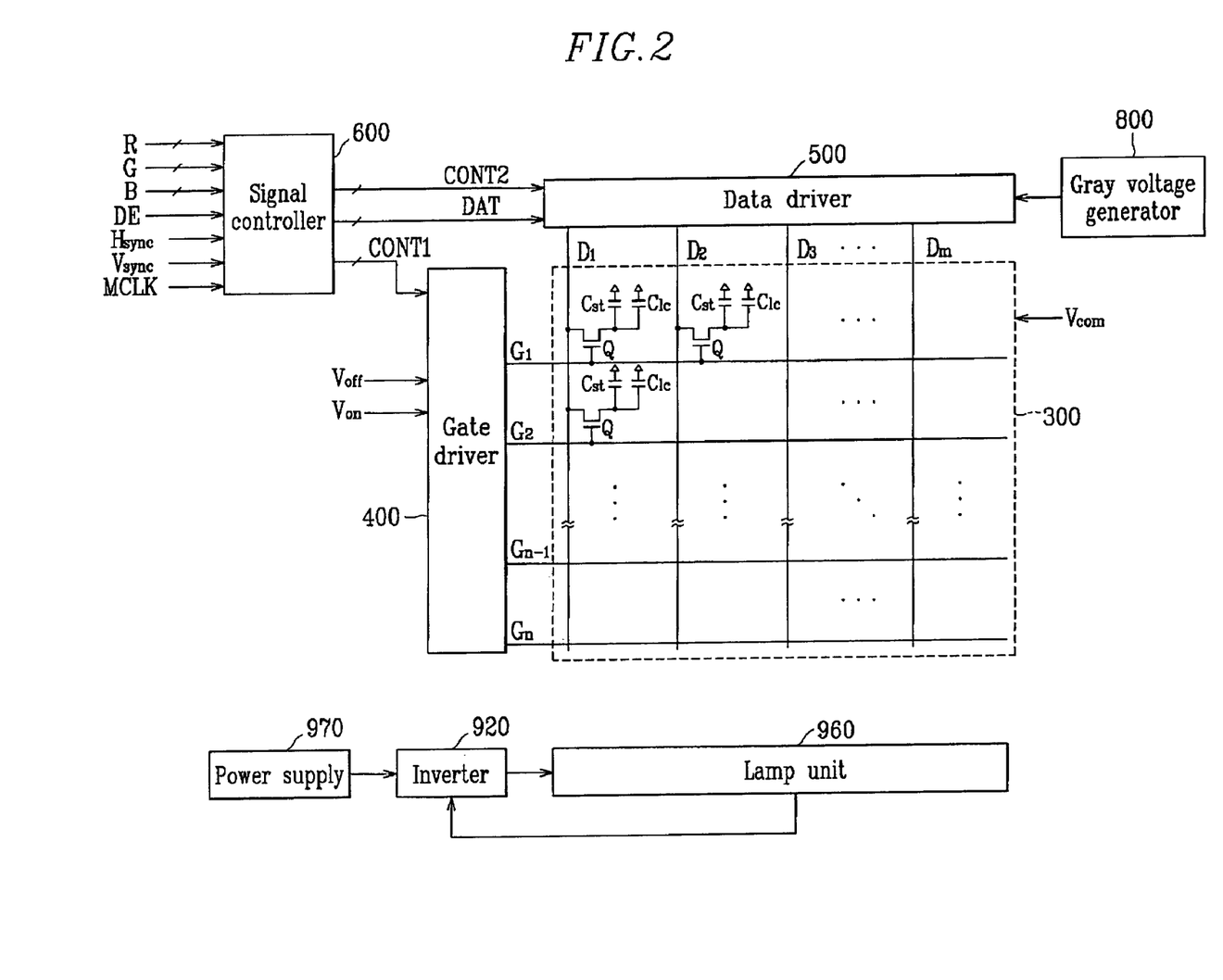
FIG. 2 is a block diagram of a part of the LCD shown in FIG. 1.
Figure 3:
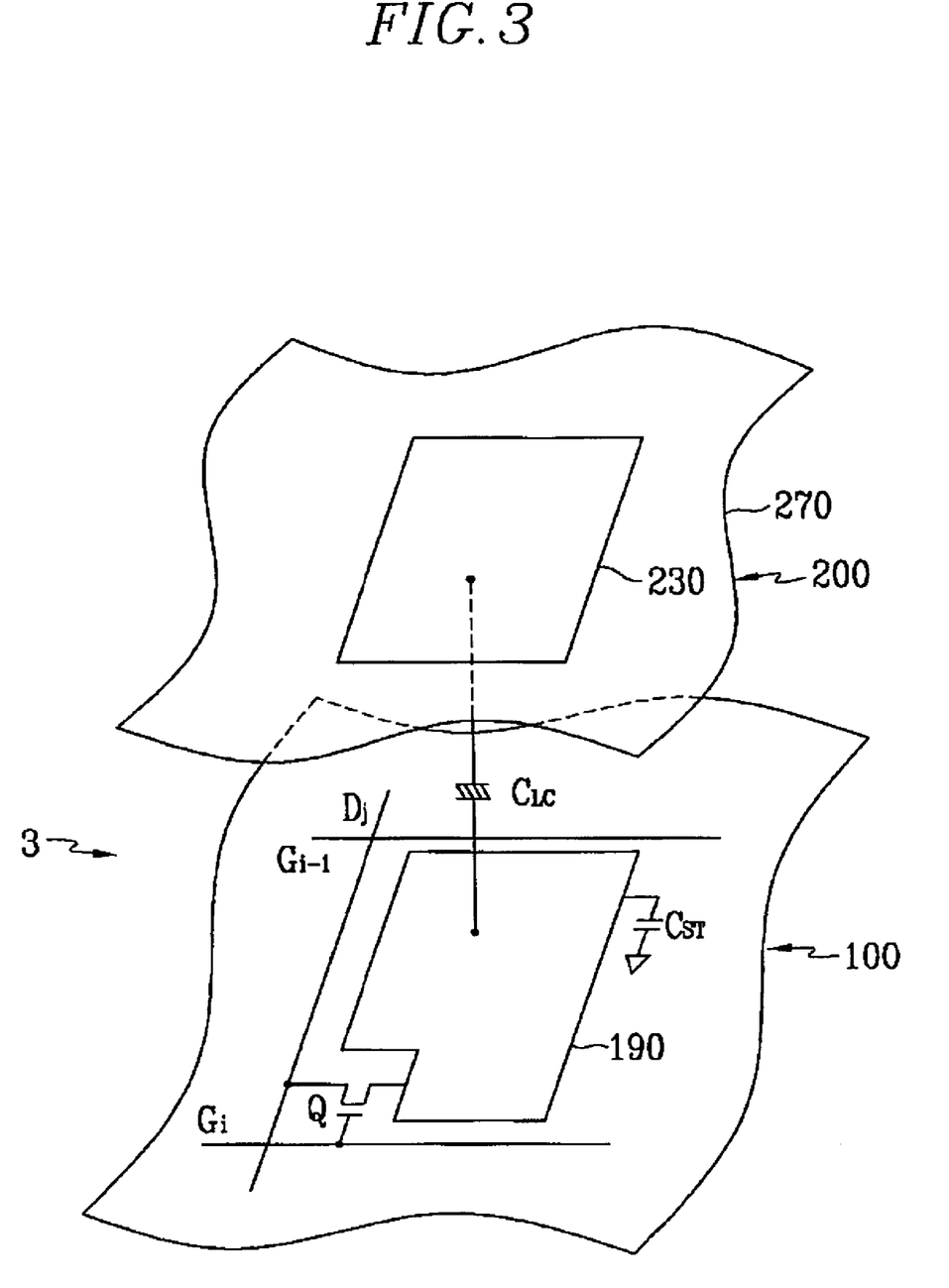
FIG. 3 is an equivalent circuit diagram of a pixel of the LCD shown in FIG. 1.

FIG. 1 is an exploded perspective view of an LCD according to an embodiment of the present invention, FIG. 2 is a block diagram of a part of the LCD shown in FIG. 1, and FIG. 3 is an equivalent circuit diagram of a pixel of the LCD shown in FIG. 1.

Referring to FIG. 1, an LCD according to an embodiment of the present invention includes a display module 350 including a display unit 330 and a backlight unit 900, and a pair of front and rear chassis 361 and 362, and a mold frame 366 containing and fixing the LC module 350.

The display unit 330 includes a display panel assembly 300, a plurality of gate tape carrier packages (TCPs) or chip-on-film (COF) packages 410, and a plurality of data TCPs 510 attached to the display panel assembly 300, and a gate printed circuit board (PCB) 450 and a data PCB 550 attached to the gate and the data TCPs 410 and 510, respectively.

The display panel assembly 300 includes a lower panel 100, an upper panel 200, and a liquid crystal layer 3 interposed therebetween as shown in FIG. 3. The display panel assembly 300 includes a plurality of display signal lines G1-Gn and D1-Dm and a plurality of pixels connected thereto and arranged substantially in a matrix in a circuital view as shown in FIG. 2.

The display signal lines G1-Gn and D1-Dm are disposed on the lower panel 100 and include a plurality of gate lines G1-Gn transmitting gate signals (also referred to as "scanning signals") and a plurality of data lines D1-Dm transmitting data signals. The gate lines G1-Gn extend substantially in a row direction and are substantially parallel to each other, while the data lines D1-Dm extend substantially in a column direction and are substantially parallel to each other.

Each pixel includes a switching element Q connected to the display signal lines G1-Gn and D1-Dm, and an LC capacitor $C_{LC}$ and a storage capacitor $C_{ST}$ that are connected to the switching element Q. The storage capacitor $C_{ST}$ may be omitted in other embodiments.

The switching element Q that may be implemented as a TFT is disposed on the lower panel 100. The switching element Q has three terminals: a control terminal connected to one of the gate lines G1-Gn; an input terminal connected to one of the data lines D1-Dm; and an output terminal connected to the LC capacitor $C_{LC}$ and the storage capacitor $C_{ST}$.

The LC capacitor $C_{LC}$ includes a pixel electrode 190 provided on the lower panel 100 and a common electrode 270 provided on an upper panel 200 as two terminals. The LC layer 3 disposed between the two electrodes 190 and 270 functions as a dielectric of the LC capacitor $C_{LC}$. The pixel electrode 190 is connected to the switching element Q, and the common electrode 270 is supplied with a common voltage Vcom and covers an entire surface of the upper panel 200. In other embodiments, the common electrode 270 may be provided on the lower panel 100, and both electrodes 190 and 270 may have shapes of bars or stripes.

The storage capacitor $C_{ST}$ is an auxiliary capacitor for the LC capacitor $C_{LC}$. The storage capacitor $C_{ST}$ includes the pixel electrode 190 and a separate signal line, which is provided on the lower panel 100 and overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel uniquely represents one of primary colors (i.e., spatial division) or each pixel sequentially represents the primary colors in turn (i.e., temporal division) such that a spatial or temporal sum of the primary colors is recognized as a desired color. An example of a set of the primary colors includes red, green, and blue colors. FIG. 2 shows an example of the spatial division in which each pixel includes a color filter 230 representing one of the primary colors in an area of the upper panel 200 facing the pixel electrode 190. Alternatively, the color filter 230 is provided on or under the pixel electrode 190 on the lower panel 100.

One or more polarizers (not shown) are attached to at least one of the panels 100 and 200.

Referring to FIGS. 1 and 2, the gray voltage generator 800 is disposed on the data PCB 550 and it generates two sets of gray voltages related to the transmittance of the pixels. The gray voltages in one set have a positive polarity with respect to the common voltage Vcom, while those in the other set have a negative polarity with respect to the common voltage Vcom.

The gate driver 400 includes a plurality of integrated circuit (IC) chips mounted on the respective gate TCPs 410 attached on an edge of the lower panel 100 of the display panel assembly 300. The gate driver 400 is connected to the gate lines G1-Gn of the panel assembly 300 through signal lines (not shown) formed on the gate TCPs 410 and synthesizes the gate-on voltage Von and the gate off voltage Voff from an external device to generate gate signals for application to the gate lines G1-Gn.

The data driver 500 includes a plurality of IC chips mounted on the respective data TCPs 510 attached on another edge of the lower panel 100 of the display panel assembly 300. The data driver 500 is connected to the data lines D1-Dm of the panel assembly 300 through signal lines (not shown) formed on the data TCPs 510, and applies data voltages selected from the gray voltages supplied from the gray voltage generator 800 to the data lines D1-Dm.

According to another embodiment of the present invention, the IC chips of the gate driver 400 or the data driver 500 are mounted on the lower panel 100. According to further another embodiment, one or both of the drivers 400 and 500 are incorporated along with other elements into the lower panel 100. The gate PCB 450 and/or the gate TCPs 410 may be omitted in such embodiments.

The gate PCB 450 is attached on the gate TCPs 410 in parallel to the lower panel 100. A plurality of signal lines (not shown) and electronic elements may be mounted on the gate PCB 450.

The data PCB 550 is attached on the data TCPs 510 in parallel to the lower panel 100. A plurality of signal lines (not shown) and electronic elements may be mounted on the data PCB 450.

As shown in FIGS. 1 and 2, the backlight unit 900 includes lamp unit 960 fixed to be spaced from the lower chassis 362 by a predetermined distance, a plurality of optical members 910 disposed between the display panel assembly 300 and the lamp unit 960 and treating light from the lamp unit 960, an inverter 920 controlling the lamp unit 960, and a power supply 970 supplying a supply voltage to the inverter 920.

The lamp unit 960 includes a plurality of lamps LP such as a fluorescent lamp, lamp holders 365 fixing and supporting the lamps LP at both ends of the respective lamps LP, a plurality of lamp fixers 364 preventing damage to lamps LP in the case when the LCD is dropped, and a reflective sheet 363 disposed entirely under all the lamps LP and reflecting the light from the lamp unit 960 toward the display panel assembly In the present embodiment, the lamps LP are CCFLs. Alternatively, the lamps LP may be EEFLs, light emitting devices (LEDs), or a flat fluorescent lamp. The number of lamps may be varied if necessary.

The inverter 920 may be mounted on a separate inverter PCB (not shown) or the gate PCB 450 or the data PCB 550. The inverter 920 will be described in detail later.

The power supply 970 full-wave rectifies a common power source of about 85V to 265V with a high current applied from the outside using a bridge rectifier, smoothing the rectified voltage using a capacitor to convert it to a voltage of about 380V, and applies the smoothed voltage to the inverter 920. The power supply 970 may include a PFC (power factor correction) device to improve the power efficiency. The power supply 970 may be mounted on the inverter PCB or may be included in a voltage generator for generating a plurality of voltages and be mounted on a separate PCB.

The optical member 910 includes a plurality of optical sheets 901 and a spread plate 902 disposed between the panel assembly 300 and the lamp unit 960, guiding and diffusing light from the lamp unit 960 to the panel assembly 300.

As shown in FIG. 1, the lamps LP are disposed under the lower panel 100, which is called a direct type of mounting. The spread plate 902 may be substituted with a light guide (not shown) and the lamps LP may be disposed near one or both sides of the light guide, which is called an edge type of mounting. Not shown in FIG. 1, a top case and a bottom case are disposed on the top chassis 361 and under the lower chassis 362, respectively, to combine the top and bottom cases to complete the LCD.

The signal controller 600 controlling the drivers 400 and 500, etc., is disposed on the data PCB 550 or the gate PCB 450.

Now, the operation of the LCD will be described in detail with reference to FIGS. 1 to 3.

Referring to FIG. 1, the signal controller 600 is supplied with input image signals R, G, and B and input control signals controlling the display thereof such as a vertical synchronization signal Vsync, a horizontal synchronization signal Hsync, a main clock MCLK, and a data enable signal DE, from an external graphics controller (not shown). After generating gate control signals CONT1 and data control signals CONT2 and processing the image signals R, G, and B to be suitable for the operation of the panel assembly 300 on the basis of the input control signals and the input image signals R, G, and B, the signal controller 600 provides the gate control signals CONT1 for the gate driver 400 and the processed image signals DAT and the data control signals CONT2 for the data driver 500.

The gate control signals CONT1 include a scanning start signal STV for instructing the gate driver 400 to start scanning, and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing the data driver 500 of start of data transmission for a group of pixels, a load signal LOAD for instructing the data driver 500 to apply the data voltages to the data lines D1-Dm, and a data clock signal HCLK. The data control signal CONT2 may further include an inversion signal RVS for reversing the polarity of the data voltages (with respect to the common voltage Vcom).

In response to the data control signals CONT2 from the signal controller 600, the data driver 500 receives a packet of the image data DAT for the group of pixels from the signal controller 600, converts the image data DAT into analog data voltages selected from the gray voltages supplied from the gray voltage generator 800, and applies the data voltages to the data lines D1-Dm.

The gate driver 400 applies the gate-on voltage Von to the gate line G1-Gn in response to the gate control signals CONT1 from the signal controller 600, thereby turning on the switching elements Q connected thereto. The data voltages applied to the data lines D1-Dm are supplied to the pixels through the activated switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on the magnitude of the pixel voltage.

The inverter 920 converts a voltage with a high current from the power supply 970 into a voltage with a low current to apply to the lamp unit 960. The lamp unit 960 is turned on or off based on the converted voltage to control the luminance of the lamp unit 960. In addition, the inverter 920 controls the lamp unit 960. The operation of the inverter 920 will be described in detail later.

The light from the lamp unit 960 passes through the LC layer 3 that experiences the change of its polarization. The change of the polarization is converted into that of light transmittance by the polarizers.

By repeating this procedure by a unit of the horizontal period (which is denoted by "1H" and is equal to one period of the horizontal synchronization signal Hsync and the data enable signal DE), all gate lines G1-Gn are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is referred to as "frame inversion"). The inversion control signal RVS may also be controlled such that the polarity of the data voltages flowing in a data line in one frame are reversed (for example, line inversion and dot inversion), or the polarity of the data voltages in one packet are reversed (for example, column inversion and dot inversion).

Now, an inverter according to an embodiment of the present invention will be described in detail with reference to FIG. 4.

Figure 4:
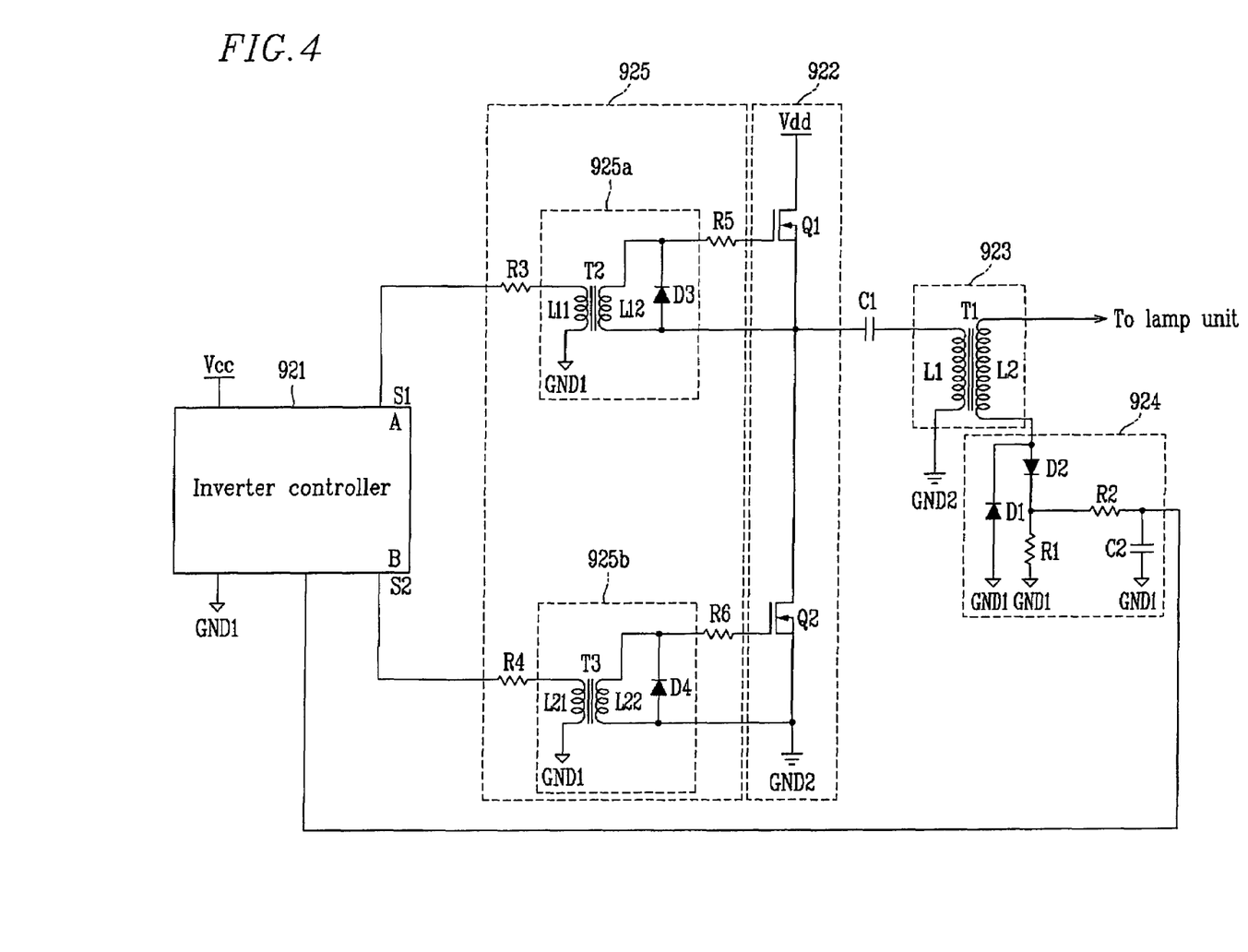
FIG. 4 is a circuit diagram of an inverter according to an embodiment of the present invention.

FIG. 4 is a circuit diagram of an inverter according to an embodiment of the present invention.

Referring to FIG. 4, the inverter 920 includes an inverter controller 921, a switching unit 922, a transformer 923 indirectly connecting the switching unit 922 to a lamp corresponding to the lamp unit 960 (shown in FIG. 2), a current sensing unit 924 directly connected to the lamp unit 960 and the inverter controller 921 through signal lines, and a signal transmitting unit 925 indirectly connecting the inverter controller 921 to the switching unit 922.

The inverter controller 921 is connected to a voltage Vcc of about 5V and a ground voltage GND1. The voltage Vcc and ground GND1 are high and low voltages with a low current based on high and low supply voltages with a low current, of which charge supplement capacities are finite, respectively.

The signal transmitting unit 925 includes a first signal transmitter 925a, a second signal transmitter 925b, a resistor R3 connected to an output terminal A of the inverter controller 921 and the first signal transmitter 925a, a resistor R5 connected to the first signal transmitter 925a and the switching unit 922, a resistor R4 connected to an output terminal B of the inverter controller 921 and the second signal transmitter 925b, and a resistor R6 connected to the second signal transmitter 925b and the switching unit 922.

The structure of the first signal transmitter 925a is the same as that of the second signal transmitter 925b, and only the structure of the first signal transmitter 925a will be described.

The first signal transmitter 925a includes a pulse transformer T2 and a diode D3 connected to both terminals of the pulse transformer T2.

The pulse transformer T2 includes a primary coil L11 directly connected between the resistor R3 and the ground GND1 and a secondary coil L12 indirectly connected to the primary coil L11, of which a terminal is connected to the resistor R5 and a cathode of the diode D3, and another terminal is connected to an anode of the diode D3.

The switching unit 922 includes switching elements Q1 and Q2 connected in series between a voltage Vdd and a ground voltage GND2. That is, the switching element Q1 has an input terminal connected to the voltage Vdd, a control terminal connected to the resistor R5 of the signal transmitting unit 925, and an output terminal connected to the secondary coil L12 of the pulse transformer T2 and the anode terminal of the diode D3. The switching element Q2 has an input terminal connected to the output terminal of the switching element Q1, a control terminal connected to the resistor R6 of the signal transmitting unit 925, and an output terminal connected to the ground GND2. In the present embodiment, the switching elements Q1 and Q2 are MOS (metal oxide silicon) transistors. In other embodiments, other types of transistors can be used for the switching elements.

The voltage Vdd and ground GND2 are high and low voltages with a high current based on high and low supply voltages with a high current, of which charge supplement capacities are infinite, respectively, contrary to the voltage Vcc and the ground GND1.

The transformer 923 is a transformer T1 including a primary coil L1 directly connected between the output terminal of the switching element Q1 of the switching unit 922 and the ground GND2, and a secondary coil L2 indirectly connected to the primary coil L1 and directly connected to corresponding lamps LP of the lamp unit 960.

The current sensing unit 924 includes a pair of diodes D1 and D2 connected to the secondary coil L2 of the transformer 923 in a reverse direction to each other, a resistor R1 connected between the diode D2 and the ground GND1, a resistor R2 connected to the diode D2 and a capacitor C2 connected between the resistor R2 and the ground GND1. The diode D1 is connected in a reverse direction from the secondary coil L2 to the ground GND1, and the diode D2 is connected in a forward direction from the secondary coil L2 of the transformer T1 to the resistor R1. The signal outputted from a common terminal of the diode D2 and the resistor R1 functions as a sensing signal of a voltage with respect to a current flowing from the resistor R1 to be applied to the inverter controller 921. One terminal of the resistor R1 is connected to the ground GND1.

A capacitor C1 is directly connected between the switching unit 922 and the transformer 923.

Now, the operation of the inverter 920 will be described in detail.

The inverter controller 921 is supplied with a dimming control signal (not shown), and a backlight ON/OFF signal (not shown) controlling the inverter unit 920 generated by pulse-with modulating an externally applied DC control signal (not shown) of a predetermined level based on a sawtooth wave of a predetermined frequency applied from an oscillating circuit (not shown).

Figure 5:
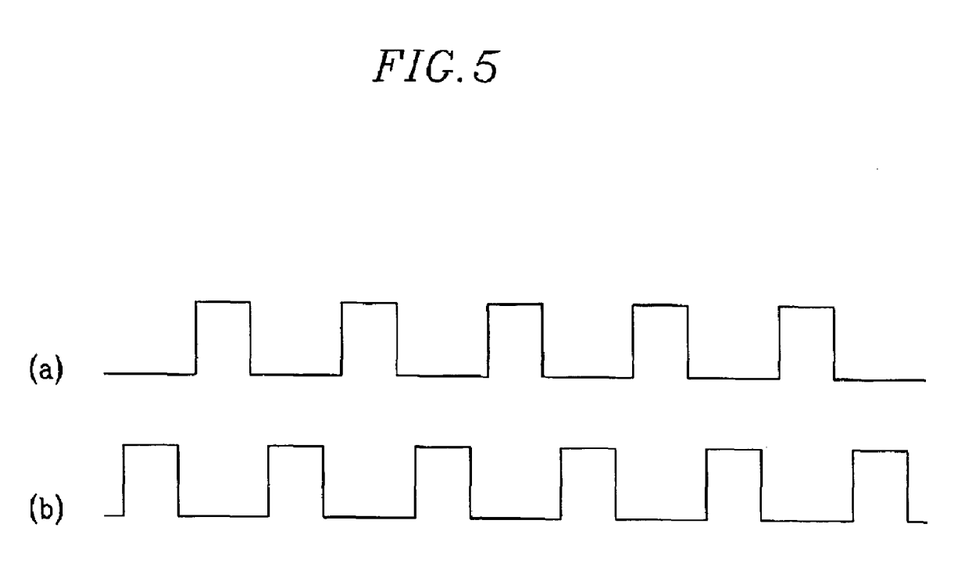
FIG. 5 shows waveforms outputted from first and second output terminals according to an embodiment of the present invention.

For controlling the switching unit 922 based on the ON/OFF signal and the dimming control signal, the inverter controller 921 outputs two signals S1 and S2, as shown by waveforms (a) and (b) in FIG. 5, through the first and second output terminals A and B connected to the signal transmitting unit 922, respectively. The signals S1 and S2 have the same period as each other, but are opposite in phases. At this time, the pulse widths and the periods of the signals S1 and S2 are defined on the basis of the ON/OFF signal and the dimming control signal.

When the signals S1 and S2 are transmitted to the first and second signal transmitter 925a and 925b through the resistors R3 and R4, respectively, currents flow through the primary coils L11 and L21 of the pulse transformers T2 and T3 of the first and second signal transmitters 925a and 925b, respectively. Thus, voltages are generated on the secondary coils L12 and L22 based on the turn ratios defined by the primary coils L11 and L21 and the secondary coils L12 and L22, respectively.

The respective diodes D3 and D4 connected to the secondary coils L12 and L22 function as half-wave rectifiers. Thus, the diodes D3 and D4 half-wave rectify the signals of only the positive (+) polarity and transmit the half-wave rectified signals to the switching elements Q1 and Q2 of the switching unit 922 connected through the respective resistors R5 and R6.

At this time, preferably, the half-wave rectified signals applied to the switching elements Q1 and Q2 have different phases, and the time period when the half-wave rectified signals maintaining a high level thereof are not overlapped with each other.

The respective switching elements Q1 and Q2 are turned on or off in accordance with the signals from the first and second signal transmitters 925a and 925b. At this time, due to the phase differences of the signals, the turned-on times of the switching elements Q1 and Q2 are not overlapped with each other.

When the switching element Q1 of the switching unit 922 is turned on based on the signal from the first signal transmitter 925a, the voltage Vdd from the power supply 970 is charged in the capacitor C1, and then is applied to the primary coil L1 of the transformer 923. At this time, the switching element Q2 of the switching unit 922 is turned off.

Next, when the switching element Q2 of the switching unit 922 is turned on based on the signal from the first signal transmitter 925b, a current with respect to the charged voltage of the capacitor C1 flows to the ground GND2 through the switching element Q2. At this time, the switching element Q1 of the switching unit 922 is turned off.

When an AC voltage is applied to the primary coil L1 of the transformer 923 by the operation of the switching unit 922, a voltage with an appropriate magnitude defined by a turn ratio of the primary coil L1 is induced to the secondary coil L2. The induced voltage is applied to a corresponding lamp of the lamp unit 960 to light the lamp.

Because the primary coil L1 and the secondary coil L2 of the transformer 923 are physically separated, though the high voltage Vdd of a high current is applied to the primary coil L1, the generated voltage of the secondary coil L2 is a voltage of a current lower than that of the voltage Vdd. That is, the high voltage Vdd of the high current is applied to only the elements between the secondary coils L12 and L22 of the first and second signal transmitters 925a and 925b and the primary coil L1 of the transformer 923.

Meanwhile, the low current with respect to the generated voltage flows through the current sensing unit 924. The diode D2 of the current sensing unit 924 half-wave rectifies an AC current flowing through the secondary coil L2 of the transformer T1. The half-wave rectified current flows to the ground GND1 through the resistor R1. The diode D1 functions as a pass for a current flowing from the ground GND1 to the secondary coil L2 of the transformer T1.

Since the voltage applied to both terminals of the resistor R1 is proportional to the current applied to a corresponding lamp of the lamp unit 960, a voltage of a common terminal of the resistor R1 and the diode D2 is applied to the inverter controller 921 as a current sensing signal. The inverter controller 921 adjusts the level of the DC control signal based on the current sensing signal to vary the duty ratio of the dimming control signal, and thereby the frequency and period of the AC voltage applied to the transformer 923 are varied, to constantly maintain the current flowing through the lamp.

Without a separate DC-DC converter, the high voltage of the high current from the power supply 970 is directly applied to the switching unit 922 of the inverter 920, and the high voltage of the high current is also applied to the transformer 923 through the switching unit 922 using the pulse transformers T2 and T3. Thus, the transformer 923 generates the voltage of the low current to light the lamp of the lamp unit 960.

Now, an inverter according to another embodiment of the present invention will be described in detail with reference to FIG. 6.

Figure 6:
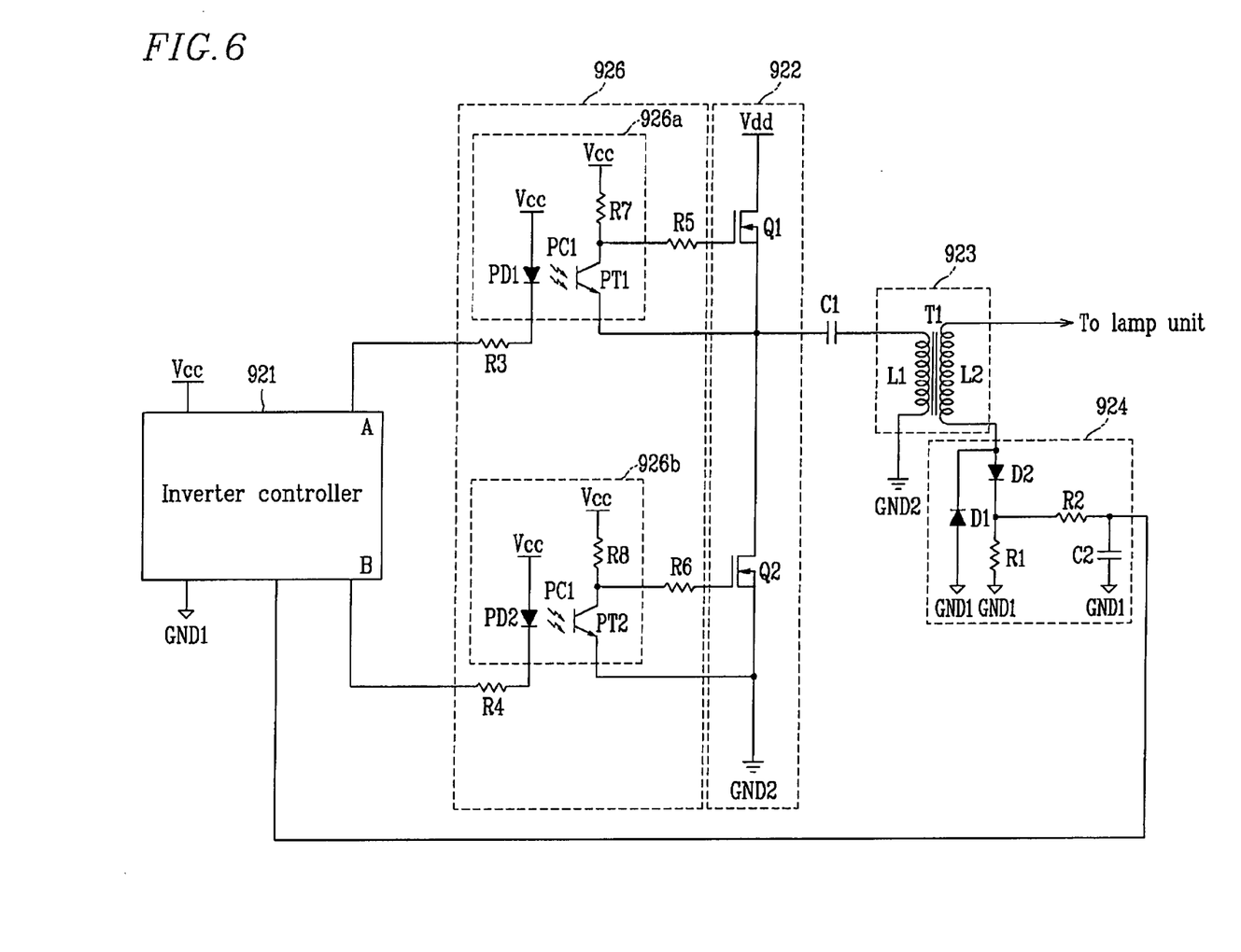
FIG. 6 is a circuit diagram of an inverter according to another embodiment of the present invention.

FIG. 6 is a circuit diagram of an inverter according to another embodiment of the present invention.

An inverter shown in FIG. 6 is substantially the same as that shown in FIG. 4 except for a signal transmitting unit 926. In detail, the first and the second signal transmitter 925a and 925b of the signal transmitting unit 925 shown in FIG. 4 include the pulse transformers T2 and T3, respectively, but first and second signal transmitter 926a and 926b of a signal transmitting unit 926 shown in FIG. 6 include photocouplers, respectively.

That is, the respective first and second signal transmitters 926a and 926b include photo diodes PD1 and PD2 directly connected between a voltage Vcc and resistors R3 and R4, and resistors R7 and R8 and photo transistors PT1 and PT2 directly connected in series between the voltage Vcc and a switching unit 922.

As described above referring to FIG. 4, the respective signals with the difference phases outputted from first and second output terminals A and B of an inverter controller 921 are applied to the first and second signal transmitters 926a and 926b through the resistors R3 and R4.

The respective photo diodes PD1 and PD2 of the first and second signal transmitters 926a and 926b are turned on or off based on the output signals of the inverter controller 921. At this time, the turned-on times of the photo diodes PD1 and PD2 are not overlapped with each other.

When the respective photo diodes PD1 and PD2 are tuned on, light emits from the photo diodes PD1 and PD2, and the corresponding photo transistors PT1 and PT2 are turned on by the light emitted from the photo diodes PD1 and PD2. Thus, the voltage Vcc is applied to the input terminals of the switching elements Q1 and Q2 of the switching unit 922 through the resistors R5 and R6. That is, though the respective photo transistors PT1 and PT2 are not directly connected to the photo diodes PD1 and PD2, the photo transistors PT1 and PT2 operates by the light from the photo diodes PD1 and PD2.

When the switching element 922 is operating as described above with reference to FIG. 4, and when an AC voltage is applied to a primary coil L1 of a transformer 922, a voltage with an appropriate magnitude defined by a turn ratio of the primary coil L1 is induced to the secondary coil L2. The induced voltage is applied to a corresponding lamp of the lamp unit 960 to light the corresponding lamp.

In this case, the high voltage Vdd of the high current is applied to only the elements between the secondary coils L12 and L22 of the first and second signal transmitters 926a and 926b and the primary coil L1 of the transformer 923.

Without a separate DC-DC converter, the high voltage of the high current from the power supply 970 is directly applied to the switching unit 922 of the inverter 920, and the high voltage of the high current is also applied to the transformer 923 through the switching unit 922 using the photo couplers PT1 and PT2. Thus, the transformer 923 generates the voltage of the low current to light the lamp.

According to the embodiments of the present invention, the pulse transformers and the photo couplers are used as the signal transmitters, but other devices transmitting the signals from the inverter controller 921 to the switching elements 922 without separate signal lines, for example lever shifters, may be used as the signal transmitters.

According to the present invention, without a separate AC-DC converter, the high voltage of the high current from the power supply is directly applied to the inverter. Thus, the manufacturing cost, size, and weight of the inverter are decreased and thereby the design efficiency is increased.

In addition, the consumption power, electromagnetic interference, and noise caused by the DC-DC converter are decreased. Moreover, heat due to the DC-DC converter is decreased, and thereby the reliability of a manufactured product is improved.

While the present invention has been described in detail with reference to the preferred embodiments, it is to be understood that the invention is not limited to the disclosed embodiments, but, on the contrary, is intended to cover various modifications and equivalent arrangements included within the spirit and scope of the appended claims.

What is claimed is:

1. A driving device comprising: a switching unit directly connected to a first voltage from a source external to the driving device; a transforming unit indirectly connected to the switching unit for transforming the first voltage into a second voltage and applying the second voltage to a light source; a signal transmitting unit including a pulse transforming unit indirectly connected to the switching unit and transmitting a driving voltage for driving the switching unit based on a control signal; and an inverter controller outputting the control signal to the signal transmitting unit, wherein the pulse transforming unit comprises a pulse transformer and a rectifier bridging a winding of the pulse transformer.

2. The driving device of claim 1 further comprising a capacitor connected to the switching unit and the transforming unit and being charged or discharged based on the operation of the switching unit.

3. The driving device of claim 1, further comprising a current sensing unit connected to the transforming unit, sensing a current flowing through the light source, and supplying information with respect to the current to the inverter controller.

4. The driving device of claim 1, wherein the switching unit comprises a first switching element including a first input terminal connected to the first voltage, a first control terminal connected to the signal transmitting unit, and a first output terminal connected to the transforming unit; and a second switching element including a second input terminal connected to the output terminal of the first switching element, a second control terminal connected to the signal transmitting unit, and a second output terminal connected to a ground.

5. The driving device of claim 4, wherein the first and second switching elements are turned on in turn.

6. The driving device of claim 4, wherein the signal transmitting unit comprises a first pulse transformer connected to the first switching element and a second pulse transformer connected to the second switching element.

7. The driving device of claim 4, wherein the first and second switching elements are MOS (metal oxide silicon) transistors.

8. A driving device comprising: a switching unit directly connected to a first voltage from a source external to the driving device; a transforming unit indirectly connected to the switching unit for transforming the first voltage into a second voltage and applying the second voltage to a light source; a signal transmitting unit indirectly connected to the switching unit and transmitting a driving voltage for driving the switching unit based on a control signal; and an inverter controller outputting the control signal to the signal transmitting unit, wherein the signal transmitting unit comprises a photocoupler.

9. The driving device of claim 8, wherein the signal transmitting unit comprises a first and a second photocoupler connected to a first switching element and a second switching element of the switching unit respectively.

10. The driving device of claim 8, wherein the signal transmitting unit comprises a photocoupler driven by the inverter controller.

11. A driving device comprising:
    a switching unit including an input terminal directly connected between a first voltage from a source external to the driving device and ground;
    a transforming unit connected to an output terminal of the switching unit and a light source;
    a signal transmitting unit including a pulse transforming unit connected to a control terminal of the switching unit; and an inverter controller outputting a control signal to the signal transmitting unit,
    wherein the transforming unit includes a single transformer member having a primary coil directly connected between the output terminal of the switching element and ground, and a secondary coil connected to the light source, and wherein the pulse transforming unit comprises a pulse transformer and a rectifier bridging a winding of the pulse transformer.

12. The driving device of claim 11, wherein the signal transmitting unit comprises a pulse transformer including a primary coil connected to the inverter controller, a secondary coil connected to the switching element, and a rectifier connected to the secondary coil.

13. The driving device of claim 11, further comprising a capacitor connected to the switching element and the transforming unit.

14. A driving device comprising:
a switching unit including an input terminal directly connected between a first voltage from a source external to the driving device and ground;
a transforming unit connected to an input terminal of the switching unit and a light source;
a signal transmitting unit connected to a control terminal of the switching unit; and
an inverter controller outputting a control signal to the signal transmitting unit,
wherein the transforming unit includes a single transformer having a primary coil directly connected between the output terminal of the switching element and ground and a secondary coil connected to the light source and wherein the signal transmitting unit comprises a photocoupler.

15. A display device comprising:
a plurality of pixels arranged in a matrix;
at least one light source supplying light to the pixels;
a switching unit directly connected between a first voltage from a source external to the display device and ground;
a transforming unit having a single transformer having primary coil directly connected between the output terminal of the switching unit and ground and an output winding coupled to the primary coil for transforming the first voltage into a second voltage and applying the second voltage to the light source;
a signal transmitting unit including a pulse transforming unit indirectly connected to the switching unit and transmitting a driving voltage for driving the switching unit based on a control signal; and an inverter controller outputting the control signal to the signal transmitting unit, wherein the pulse transforming unit comprises a pulse transformer and a rectifier bridging a winding of the pulse transformer.

16. The display device of claim 15, further comprising a capacitor connected to the switching unit and the transforming unit and being charged or discharged based on the operation of the switching unit.

17. The display device of claim 15, wherein the signal transmitting unit is a pulse transforming unit.

18. The display device of claim 17, wherein the pulse transforming unit comprises a pulse transformer and a rectifier.

19. A driving device comprising: a switching unit including an input terminal directly connected between a first voltage from a source external to the driving device and ground; a transforming unit connected to an output terminal of the switching unit and a light source; a signal transmitting unit connected to a control terminal of the switching unit; and an inverter controller outputting a control signal to the signal transmitting unit,
wherein the transforming unit includes a single transformer member having a primary coil directly connected between the output terminal of the switching element and ground and a secondary coil connected to the light source and, wherein the signal transmitting unit comprises a photocoupler.

* * * * *